(12) United States Patent
Chen et al.

(10) Patent No.: US 8,547,434 B2
(45) Date of Patent: Oct. 1, 2013

(54) INTEGRATED IMAGE SURVEILLANCE SYSTEM AND IMAGE SYNTHESIS METHOD THEREOF

(75) Inventors: Yong-Sheng Chen, Hsinchu (TW); Yung-Cheng Cheng, Hsinchu (TW); Kai-Ying Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1215 days.

(21) Appl. No.: 12/370,668

(22) Filed: Feb. 13, 2009

(65) Prior Publication Data

US 2009/0256908 A1 Oct. 15, 2009

(30) Foreign Application Priority Data

Apr. 10, 2008 (TW) ................................ 97112949 A

(51) Int. Cl.
*H04N 7/18* (2006.01)
(52) U.S. Cl.
USPC .......................................... 348/143; 348/159
(58) Field of Classification Search
USPC .................................................. 348/143, 159
See application file for complete search history.

(56) References Cited

U.S. PATENT DOCUMENTS

| 5,670,935 | A | 9/1997 | Schofield et al. | |
|---|---|---|---|---|
| 5,680,123 | A | 10/1997 | Lee | |
| 5,982,951 | A | 11/1999 | Katayama et al. | |
| 6,476,855 | B1* | 11/2002 | Yamamoto | 348/148 |
| 6,919,917 | B1 | 7/2005 | Janssen | |
| 7,139,412 | B2 | 11/2006 | Kato et al. | |
| 7,881,559 | B2* | 2/2011 | Park et al. | 382/284 |
| 2001/0017651 | A1* | 8/2001 | Baker et al. | 348/169 |
| 2002/0180759 | A1* | 12/2002 | Park et al. | 345/629 |
| 2002/0196340 | A1* | 12/2002 | Kato et al. | 348/148 |
| 2009/0219387 | A1* | 9/2009 | Marman et al. | 348/143 |
| 2010/0097470 | A1* | 4/2010 | Yoshida et al. | 348/159 |
| 2010/0110167 | A1* | 5/2010 | Harada et al. | 348/61 |

FOREIGN PATENT DOCUMENTS

| JP | 63-106872 A | 5/1988 |
|---|---|---|
| JP | 7-203299 A | 8/1995 |
| JP | 8-221545 A | 8/1996 |
| JP | 2001-109909 A | 4/2001 |
| JP | 2004-214830 A | 7/2004 |
| JP | 2007-36756 A | 2/2007 |

\* cited by examiner

*Primary Examiner* — Lynn Feild
*Assistant Examiner* — Lin Liu
(74) *Attorney, Agent, or Firm* — Rosenberg, Klein & Lee

(57) ABSTRACT

Disclosed is an integrated multi-view surveillance system which integrates multiple surveillance camera images of an area into a large-coverage image of the area in order to monitor the area. The system includes a first camera, a second camera, a third camera, an image processing device, and a display device. The image processing device includes a first defining component, a first synthesis component, a second defining component, an adjusting component, a transforming component, a third defining component, and a second synthesis component.

14 Claims, 18 Drawing Sheets

INTEGRATED IMAGE SURVEILLANCE SYSTEM AND IMAGE SYNTHESIS METHOD THEREOF

BACKGROUND OF THE INVENTION

1. Technical Field

The present invention relates to an image surveillance system and, more particularly, to an integrated image surveillance system and an image synthesis method thereof, wherein the system is capable of integrating video images captured by multiple cameras of an area into a large-coverage image of the area, as well as changing between different surveillance angles rapidly and smoothly, so as to facilitate monitoring of the area.

2. Description of Related Art

Recently, public security has become an issue due to rising crime rates. To ensure personal safety, people resort to a variety of security systems, among which intelligent video surveillance systems have drawn more and more attention. For a conventional large-scale video surveillance system to monitor an area effectively, several cameras are deployed at different locations in the monitored area so that images taken by the cameras cover the entire area. Hence, the larger the monitored area is, the more cameras need to be installed. The images captured by the cameras are displayed in multiple windows on a screen, as shown in FIG. 1, and monitored by a security guard. Since the views are separated and the lack of spatial relation information between the adjacent screens, the security guard may easily be distracted and miss important information and details in the images. The multiple screens may also confuse the security guard visually. Moreover, it is difficult to track an object of interest through the multiple screens and the security guard may become disoriented and misjudge in the course of tracking.

BRIEF SUMMARY OF THE INVENTION

In order to solve the aforementioned problems, the present invention provides an integrated image surveillance system and an image synthesis method thereof, wherein the integrated image surveillance system integrates video images taken by multiple cameras of an area into a static, large-coverage image of the area, so as to add a sense of space to the surveillance images and allow a person monitoring the images to perform extensive tracking and change monitoring angles rapidly and smoothly, thereby providing improved monitoring functions.

Therefore, an objective of the present invention is to provide an integrated image surveillance system which integrates video images captured by multiple cameras installed in a monitored area into a static, wide-range image of the area and thus produces a clear integrated image for easy monitoring.

Another objective of the present invention is to provide an image synthesis method for use in a surveillance system, wherein a stitching area between images is processed and smoothed.

Yet another objective of the present invention is to provide a method for changing surveillance angles of an integrated image surveillance system, wherein a technique is applied to enable rapid, smooth, and arbitrary change of the monitoring angles.

To achieve the foregoing objectives, the present invention provides an integrated image surveillance system essentially including: a first camera, a second camera, an image processing device, and a display device. The image processing device further includes a first defining component, a first synthesis component, and an adjusting component. The first camera captures a large-coverage first image of an area, wherein the first image is a two-dimensional image containing static data. The second camera captures a small-coverage second image of the same area, wherein the second image is a two-dimensional image containing dynamic data, and the second image and the first image have a first overlap region. The image processing device synthesizes a third image from the second image and the first image in the following manner. To begin with, the first defining component of the image processing device defines first set of feature points in the first image and second set of feature points in the second image, wherein the first set of feature points and the second set of feature points have a first registration relation, and the first registration relation further defines a first registration function for the first image and the second image. Then, the second image is superimposed on the first image through the first registration function, wherein for the first overlap region, the data of the second image replace the data of the first image and are shown in the third image.

However, upon integration of the first image and the second image, at least one seam is formed at a border of the first overlap region of the two images, and image chromaticity on two sides of the seam is discontinuous. To overcome this problem, the present invention further uses the adjusting component of the image processing device to adjust discontinuous image chromaticity in the third image on two sides of a seam between the first image and the second image. Finally, the third image is displayed by the display device.

The present invention further provides an image synthesis method for use in a surveillance system, wherein the image synthesis method essentially includes: capturing a static, large-coverage first image of an area; capturing a dynamic, small-coverage second image of the area, wherein the second image and the first image have a first overlap region, and the two images are both two-dimensional images; and providing an image processing step which includes: defining first set of feature points in the first image and second set of feature points in the second image, wherein the first set of feature points and the second set of feature points have a first registration relation, and a first registration function for the first image and the second image is derived from the first registration relation; and integrating the first image and the second image according to the first registration function so as to form a third image, wherein for the first overlap region, data of the second image are shown in the third image. At least one seam is formed at a border of the overlap region of the first image and the second image, with image chromaticity on two sides of the seam being discontinuous. Therefore, the image processing step further includes an adjusting procedure to adjust discontinuous image chromaticity in the third image on two sides of a seam between the first image and the second image. Finally, the third image is displayed.

The present invention further provides an integrated image surveillance system essentially including: a first camera for capturing a low-resolution first image of an area; a second camera for capturing a high-resolution second image of the area, wherein the second image and the first image have a first overlap region, and both the first and second images are two-dimensional images; an image processing device; and a display device. The image processing device includes: a first defining component which defines first set of feature points in the first image and second set of feature points in the second image, wherein the first and the second sets of feature points have a first registration relation, and the first registration relation defines a first registration function for the first image and the second image; and a first synthesis component which integrates the first image and the second image according to the first registration function so as to form a third image, wherein for the overlap region, data of the second image are shown in the third image, and at least one seam is formed at a border of the overlap region of the first and second images, with image chromaticity on two sides of the seam being discontinuous. To overcome the problem of discontinuous image chromaticity, the image processing device further includes an adjusting component to adjust discontinuous image chromaticity in the third image on two sides of a seam between the first image and the second image. Finally, the third image is displayed.

The present invention further provides an image synthesis method for use in a surveillance system. The image synthesis method essentially includes: capturing a low-resolution first image of an area; capturing a high-resolution second image of the area, wherein the second image and the first image have a first overlap region, and both the first and second images are two-dimensional images; and providing an image processing step which includes: defining first set of feature points in the first image and second set of feature points in the second image, wherein the first set of feature points and the second set of feature points have a first registration relation, and the first registration relation defines a first registration function for the first image and the second image; and integrating the second image and the first image according to the first registration function so as to form a third image, wherein for the first overlap region, data of the second image are shown in the third image, and at least one seam is formed at a border of the overlap region of the first and second images, with image chromaticity on two sides of the seam being discontinuous. Therefore, the image processing step further includes an adjusting procedure to adjust discontinuous image chromaticity in the third image on two sides of a seam between the first image and the second image. Finally, the third image is displayed.

BRIEF DESCRIPTION OF THE SEVERAL VIEWS OF THE DRAWINGS

The invention as well as a preferred mode of use, further objectives and advantages thereof will be best understood by referring to the following detailed description of illustrative embodiments in conjunction with the accompanying drawings, wherein.

DETAILED DESCRIPTION OF THE INVENTION

Figure 1:
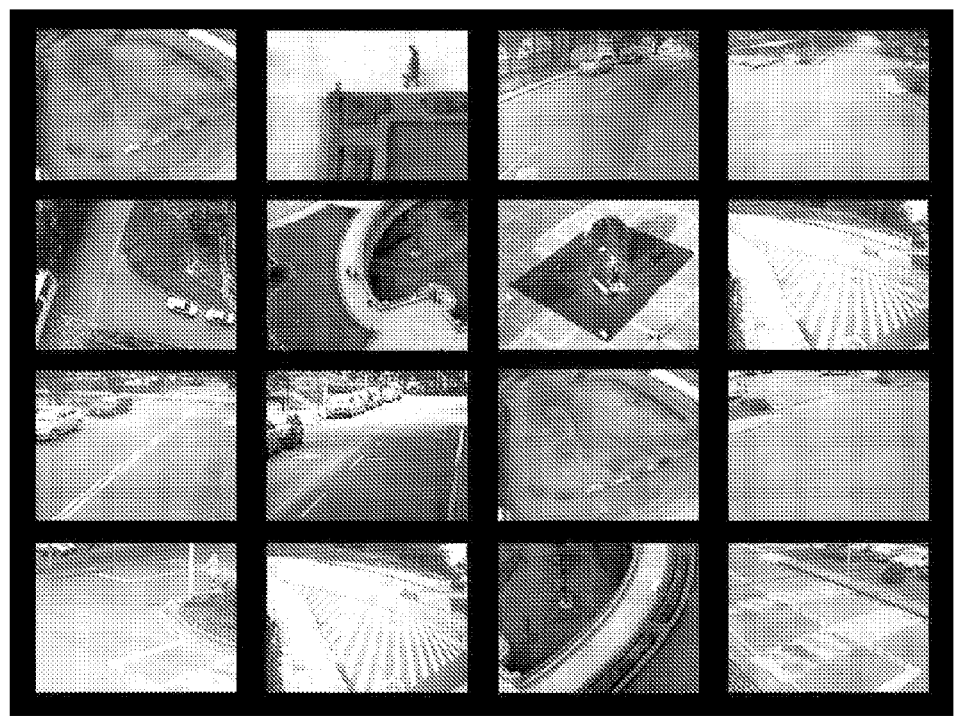
FIG. 1 shows a screen image of a conventional surveillance system.

Referring to FIG. 2 and FIGS. 3A-3C, an integrated image surveillance system 100 according to an embodiment of the present invention essentially includes a first camera 110, a second camera 120, an image processing device 140, and a display device 160. The image processing device 140 further includes a first defining component 142, a first synthesis component 144, a second defining component 146, an adjusting component 148, and a transforming component 150. The first camera 110 captures a large-coverage first image 210 of an area, such as an aerial photograph, and the first image 210 is a two-dimensional image containing static data. The second camera 120 captures a small-coverage second image 230 of the same area, such as a video image taken by a surveillance camera, wherein the second image 230 is a two-dimensional image containing dynamic data, and the second image 230 and the first image 210 have a first overlap region 220. The image processing device 140 synthesizes the second image 230 and the first image 210 so as to form a third image 240 in the following manner. First, the first defining component 142 of the image processing device 140 defines four or more first feature points 211-216 in the first image 210 and corresponding second set of feature points 231-236 in the second image 230, wherein the first set of feature points and the second set of feature points are characteristics shared by the two images and have a first registration relation, and the first registration relation defines a first registration function for the first image and the second image. Then the first synthesis component 144 synthesize the first image 210 and the second image 230 so as to form a third image 240 through the first registration function Where the second image 230 and the first image 210 are overlapped, data of the second image 230 replace the data of the first image 210 and are shown in the third image 240.

Figure 2:
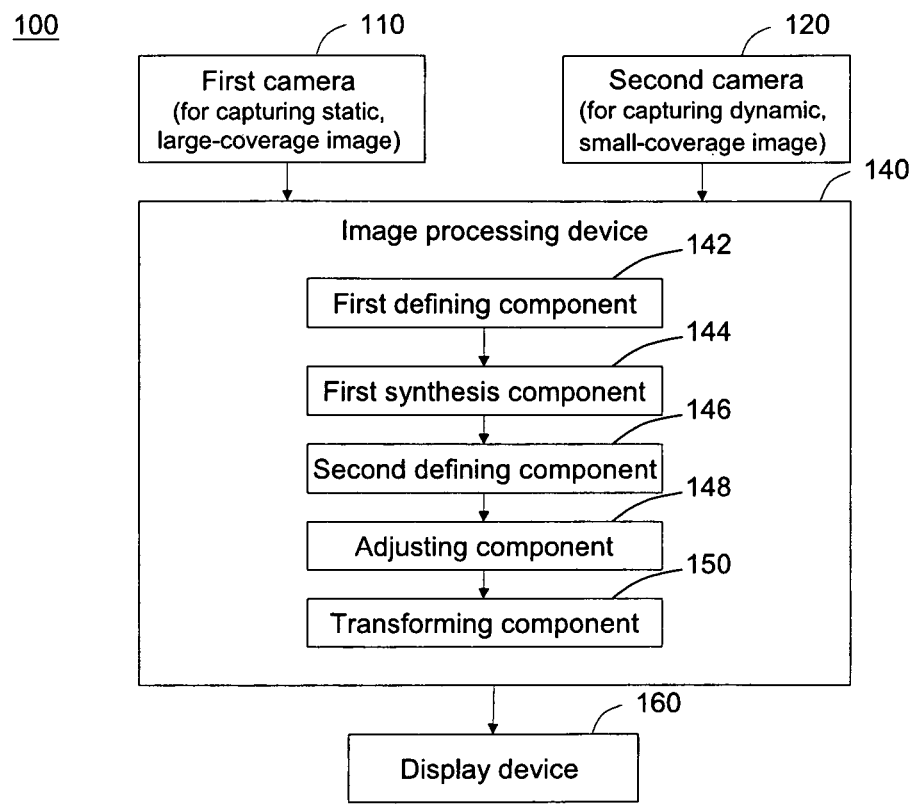
FIG. 2 is a block diagram of an integrated image surveillance system according to one embodiment of the present invention.
Figure 3A:
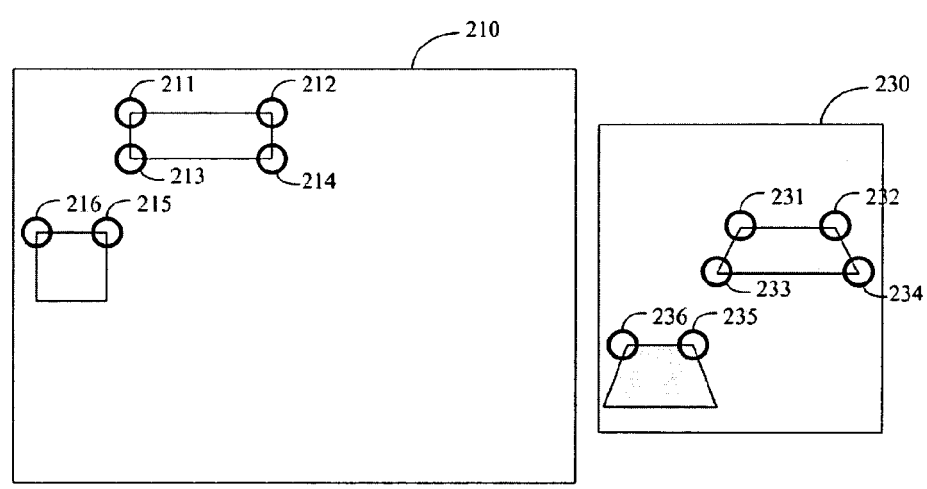
FIG. 3A is a schematic drawing showing a first image and a second image.
Figure 3B:
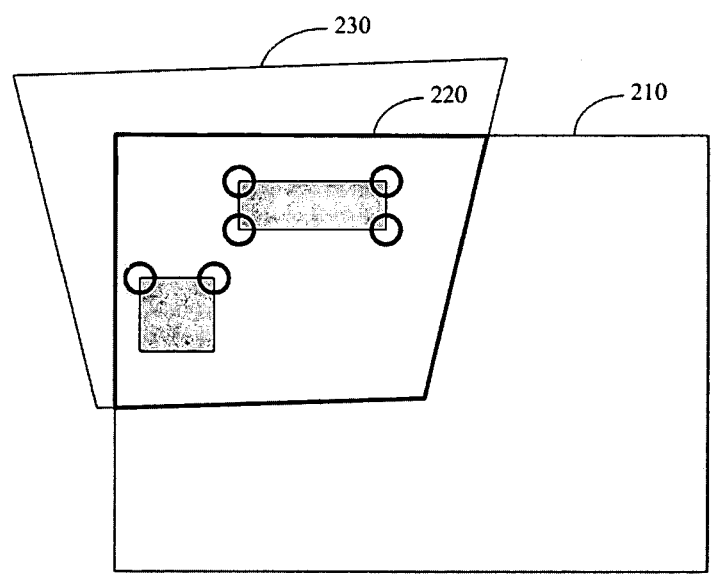
FIG. 3B is a schematic drawing showing integration of the first image and the second image.
Figure 3C:
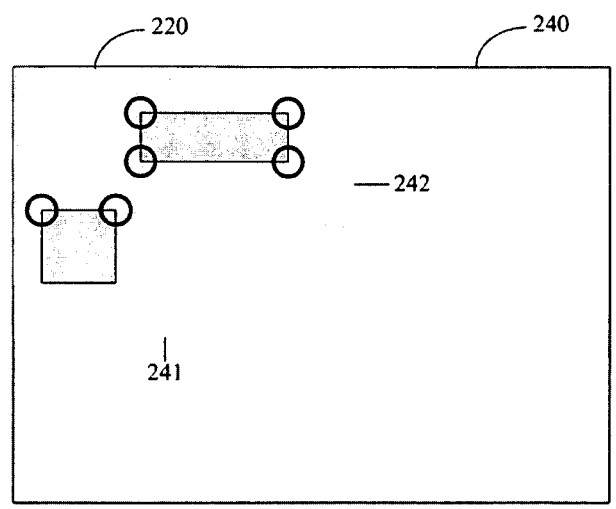
FIG. 3C shows a third image formed by integration of the first image and the second image.
Figure 3D:
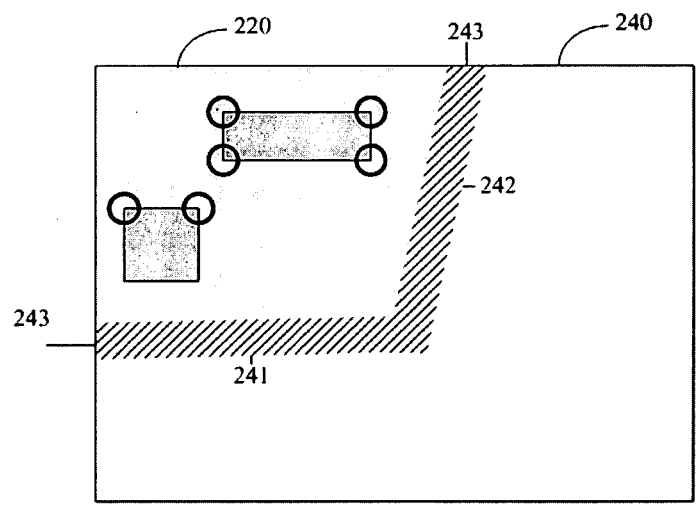
FIG. 3D is a schematic drawing showing a stitching area between the first image and the second image.

Referring to FIG. 2 and FIGS. 3C-3D, upon integration of the first image 210 and the second image 230, at least one seam (i.e., seams 241 or 242) is formed at a border of the overlap region of the two images, and image chromaticity on two sides of the seams 241-242 are discontinuous. To overcome the problem of discontinuous image chromaticity, according to the present invention, the second defining component 146 defines the first image 210 into first set of image points each having a first image chromaticity, the second image 230 into second set of image points each having a second image chromaticity, and the third image 240 into third set of image points each having a third image chromaticity. Next, adjusting component 148 of the image processing device 140 extracts an appropriate range around the seams 241-242 as a stitching area 243, wherein the stitching area 243 is at least part of the first overlap region 220 of the first image and the second image. Then the adjusting component 148 mixes the first image chromaticities of the first set of image points and the second image chromaticities of the second set of image points in the stitching area 243 at an appropriate ratio to produce corrected third image chromaticities for the third set of image points in the stitching area 243, thereby blurring the stitching area 243 and merging the two images smoothly. Afterward, in order to provide the integrated third image 240 with a sense of space, the transforming component 150 of the image processing device 140 performs three-dimensional reconstruction on the third image 240 to transform the third image 240 from a two-dimensional image to a three-dimensional image. Finally, the display device 160 displays the processed third image 240.

Figure 4:
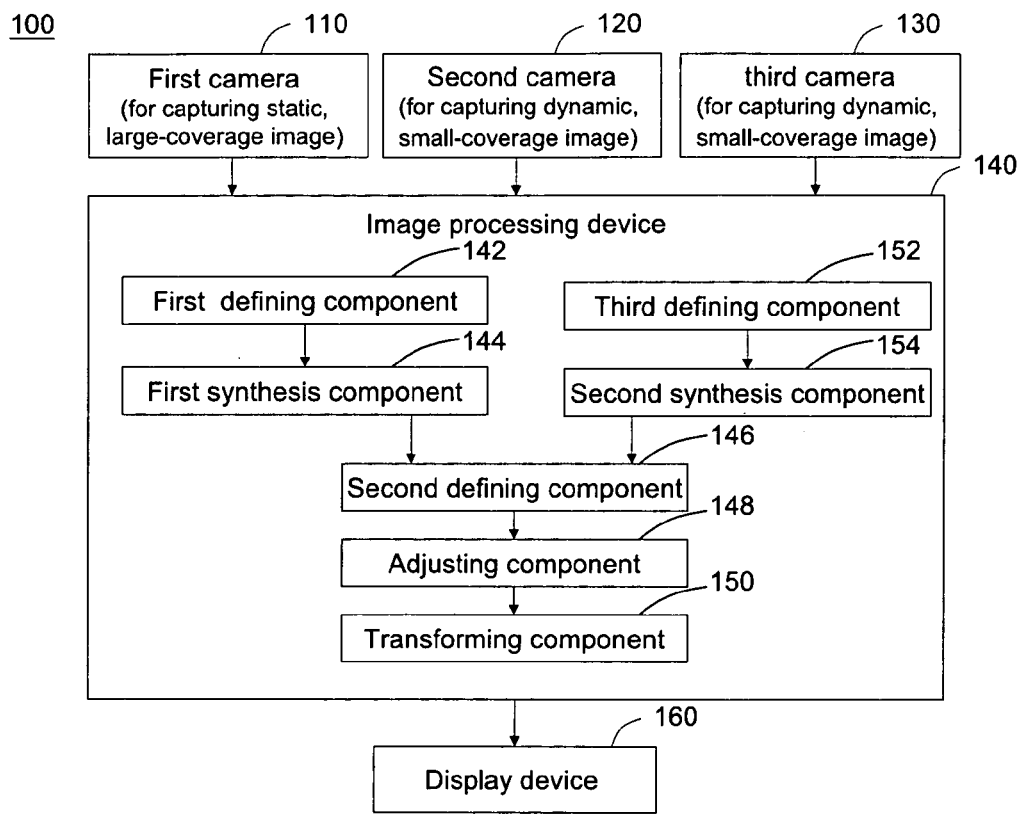
FIG. 4 is a block diagram of an integrated image surveillance system according to another embodiment of the present invention.
Figure 5A:
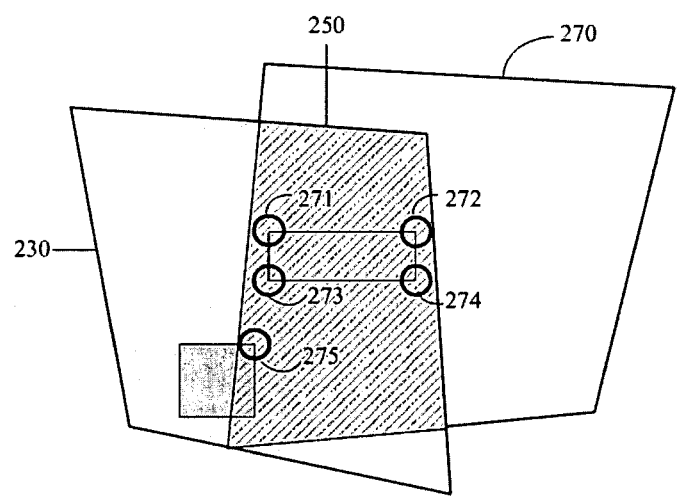
FIG. 5A is a schematic drawing showing the second image and a fourth image, wherein the two images have an overlap region where they overlap.
Figure 5B:
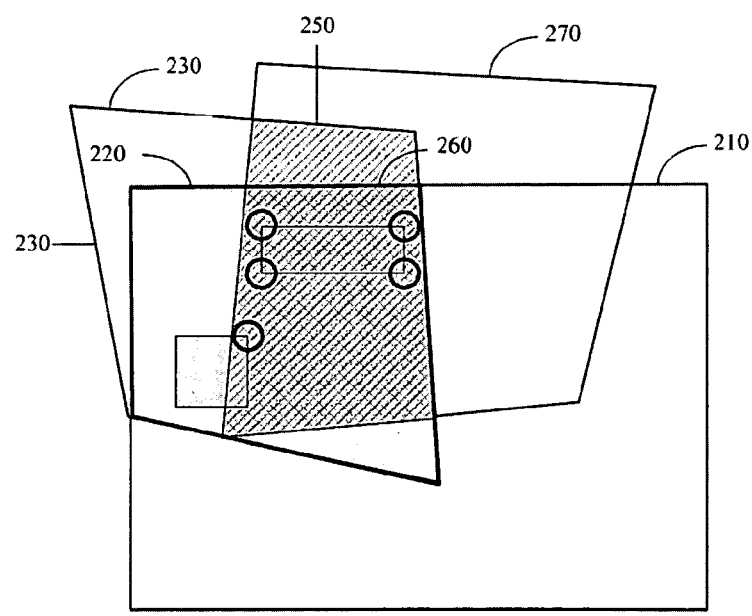
FIG. 5B is a schematic drawing showing integration of the first image, the second image and the fourth image, wherein the three images have an overlap region where they overlap.
Figure 6:
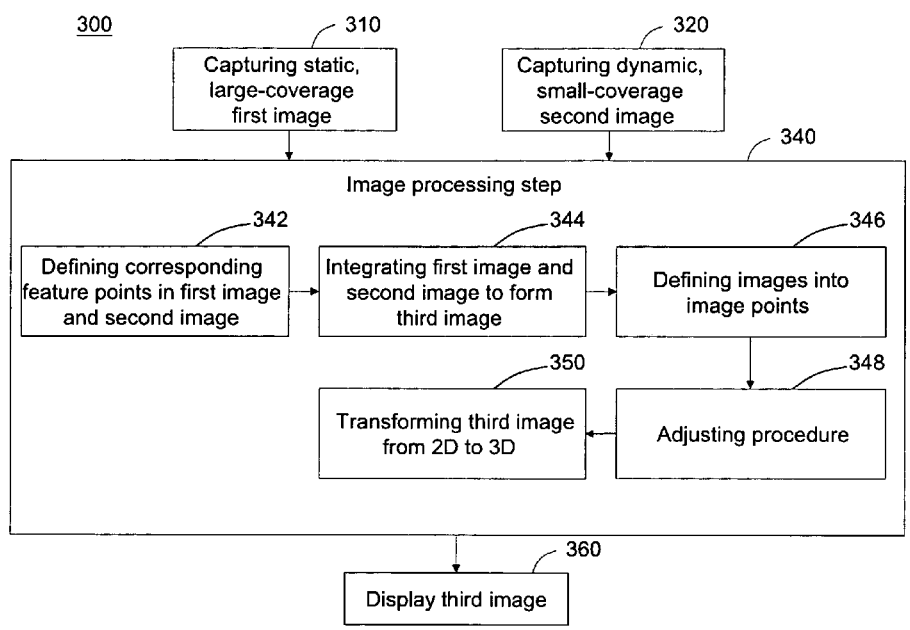
FIG. 6 is a flowchart of an image synthesis method for use in a surveillance system according to yet another embodiment of the present invention.

Referring to FIG. 4 and FIGS. 5A-5B for another embodiment of the present invention as a continuation from the previous embodiment, the integrated image surveillance system 100 further includes a third camera 130, which is an additional surveillance camera in the monitored area for capturing a dynamic, small-coverage fourth image 270 of the area. The fourth image 270 and the second image 230 have a second overlap region 250 (the hatched area in FIG. 5A), and the second overlap region 250 and the first overlap region 220 of the first image 210 and the second image 230 have a third overlap region 260 (the crisscrossed area in FIG. 5B). The image processing device 140 further includes a third defining component 152 which defines four or more feature points 271-275 in a portion of the fourth image 270 that is in the third overlap region 260, and third set of feature points 231-235 in a portion of the second image 230 that is in the third overlap region 260. The fourth set of feature points and the third set of feature points have a second registration relation, and the second registration relation further defines a second registration function for the fourth image 270 and the second image 230. A second synthesis component 154 integrates the second image 230 and the fourth image 270 according to the second registration function so as to form a fifth image. Where the fourth image 270 and the second image 230 are overlapped, the data of the second image 230 or the data of the fourth image 270 are shown in the fifth image. Finally, the display device 160 displays the fifth image. Chromatic difference between the second image 230 and the fourth image 270 can also be adjusted by the second defining component 146 and the adjusting component 148 to provide the fifth image with better visual effect.

Referring now to FIG. 6 and FIGS. 3A-3D, an image synthesis method 300 for use in a surveillance system according to another embodiment of the present invention essentially includes: a step 310 of capturing a static, large-coverage first image 210 of an area; a step 320 of capturing a dynamic, small-coverage second image 230 of the area, wherein the second image 230 and the first image 210 have a first overlap region 220, and the two images are both two-dimensional images; providing an image processing step 340; and a step 360 of displaying a third image. The image processing step 340 further includes: a step 342 of defining first set of feature points in the first image 210 and second set of feature points in the second image 230, wherein the first set of feature points and the second set of feature points have a first registration relation, and a first registration function for the first image 210 and the second image 230 is derived from the first registration relation; and a step 344 of integrating the first image 210 and the second image 230 into the third image 240, wherein for the overlap region, data of the second image 230 are shown in the third image 240. At least one seam (i.e., seams 241 or 242) is formed at a border of the overlap region of the first image 210 and the second image 230, with image chromaticity on two sides of the seam being discontinuous. Therefore, the steps to adjust the discontinuous image chromaticity are brought out. First, at a step 346, the first image 210, the second image 230, and the third image 240 are defined respectively into first set of image points each having a first image chromaticity, second set of image points each having a second image chromaticity, and third set of image points each having a third image chromaticity. Then, an appropriate range around the seam is extracted as a stitching area 243. Afterward, as part of the step 348, the first image chromaticities of the first set of image points in the stitching area 243 and the second image chromaticities of the second set of image points in the stitching area 243 are mixed at an appropriate ratio to produce corrected third image chromaticities for the third set of image points in the stitching area 243. Subsequently, at a step 350, which concludes the image processing step 340, the third image 240 is transformed from a two-dimensional image to a three-dimensional image enriched with a sense of space. Finally, the third image 240 is displayed at a step 360.

Figure 7:
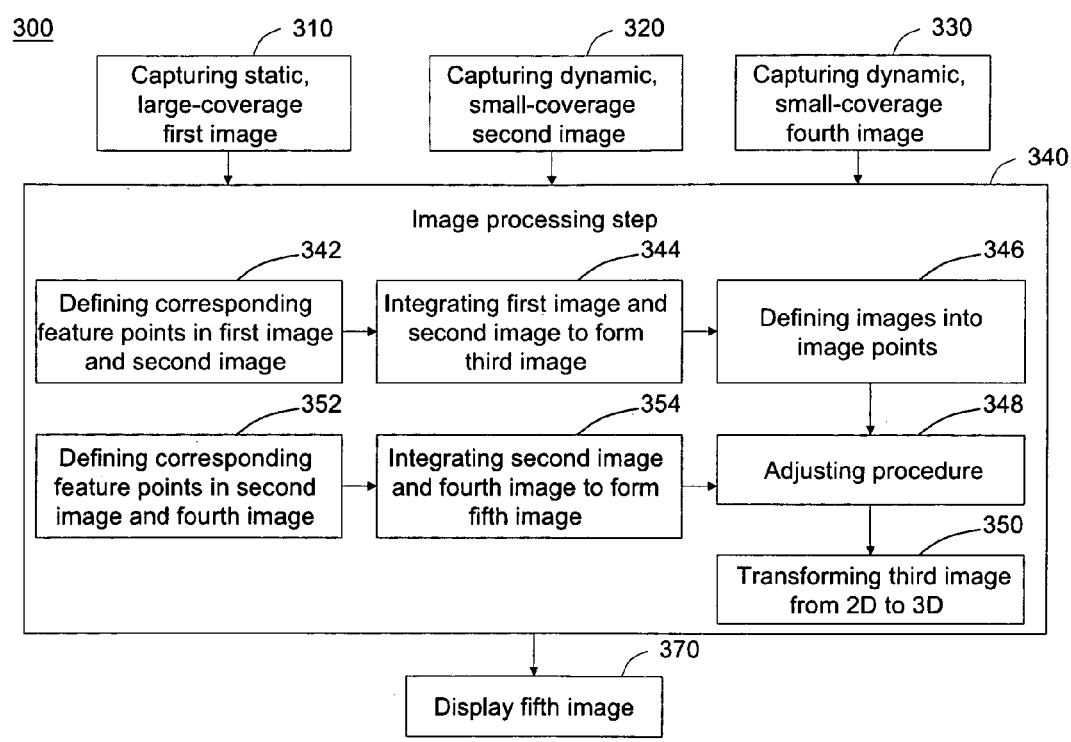
FIG. 7 is a flowchart of an image synthesis method for use in a surveillance system according to still another embodiment of the present invention.

Referring to FIGS. 5A-5B and FIG. 7 for another embodiment of the present invention as a continuation of the preceding embodiment, the image synthesis method 300 further includes a step 330 of capturing a dynamic, small-coverage fourth image 270 of the monitored area, wherein the fourth image 270 and the second image 230 have a second overlap region 250, and the second overlap region 250 and the first overlap region 220 have a third overlap region 260. In addition, the image processing step 340 further includes: a step 352 of defining fourth set of feature points 271-275 in a portion of the fourth image 270 that is in the third overlap region 260, and third set of feature points 231-235 in a portion of the second image 230 that is in the third overlap region 260, wherein the fourth set of feature points and the third set of feature points have a second registration relation, and the second registration relation further defines a second registration function for the fourth image 270 and the second image 230; and a step 354 of integrating the second image 230 and the fourth image 270 so as to form a fifth image, wherein, upon overlapping of the fourth image 270 and the second image 230, the data of the second image 230 or data of the fourth image 270 are shown in the fifth image. After adjusting the image chromaticity of the fifth image, finally, the fifth image is displayed at a step 370.

Figure 8:
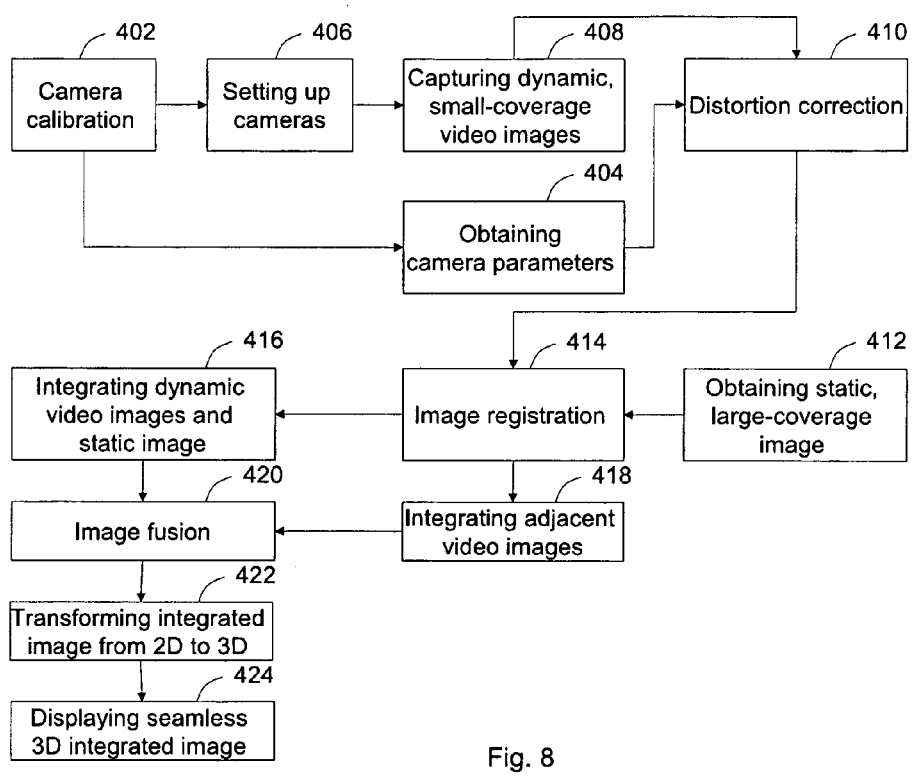
FIG. 8 is a detailed flowchart of the image synthesis method for use in a surveillance system according to the present invention.

The present embodiment is now explained in detail by reference to FIG. 8 and FIGS. 9A-9B in a step-by-step manner. First, the cameras to be installed in the monitored area are calibrated (step 402), and initial, internal and external parameters of the cameras are obtained (step 404). Then, the calibrated cameras are set up around the monitored area (step 406) to capture dynamic, small-coverage video images of the area, i.e., the second image 230 and the fourth image 270 (step 408). Distortions in the captured images are corrected with the parameters of the cameras obtained from step 404 (step 410). A static, large-coverage image of the area, i.e., the first image 210, such as an aerial photograph, is obtained in advance (step 412), and a registration relation between the large-coverage image and the small-coverage surveillance video images is determined by the homography approach. The homography defines a registration relation between planes, such that a relation between two-dimensional coordinates P and two-dimensional coordinates m can be expressed by the following registration function:

$$s\tilde{m} = H\tilde{P}$$

$$s\begin{bmatrix} u \\ v \\ 1 \end{bmatrix} = H \begin{bmatrix} X \\ Y \\ 1 \end{bmatrix}$$

At least four pairs of corresponding points are selected from the two planar images, respectively, to estimate H and thereby determine a precise, spatial registration relation between the surveillance camera video images and the image to be integrated therewith (step 414). Thus, the dynamic video images and the static image are integrated precisely into one image, i.e., the third image 240 (step 416).

In this embodiment, at least two cameras (the second camera 110 and the third camera 130) are used to monitor the area, and the two cameras are set up in such a way that images taken thereby (the second image 230 and the fourth image 270) have overlapping borders (in the second overlap region 250) to facilitate observation of a target moving from the field of view of one camera to that of the other. Image integration is performed in the same ways as described above, that is, by first locating points that represent common characteristics of the images so as to define a registration relation therebetween (step 414), and then applying the homography approach to integrate the images together (step 418). Due to the presence of the overlap region, it is necessary to find therein more points that represent the characteristics of the images so that the subsequent integration is conducted with more precision. Thus, a target moving from the field of view of one camera to that of the other camera will not disappear for a few seconds and then show up again in the actually synchronously displayed images.

Figure 9A:
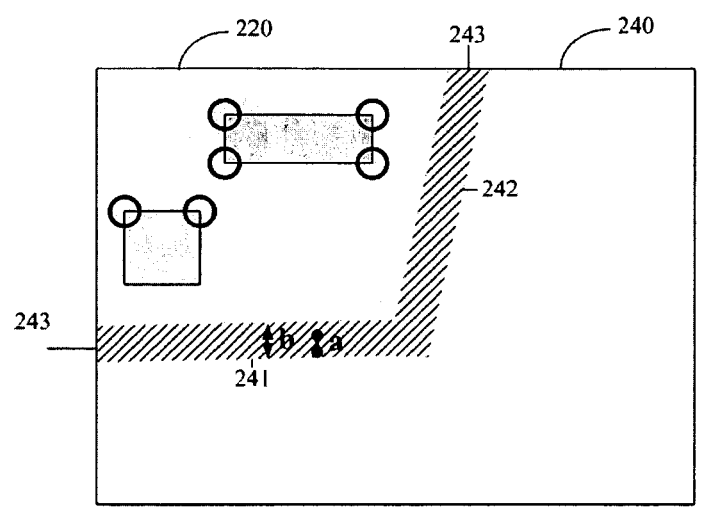
FIG. 9A is another schematic drawing showing the stitching area between the first image and the second image.
Figure 9B:
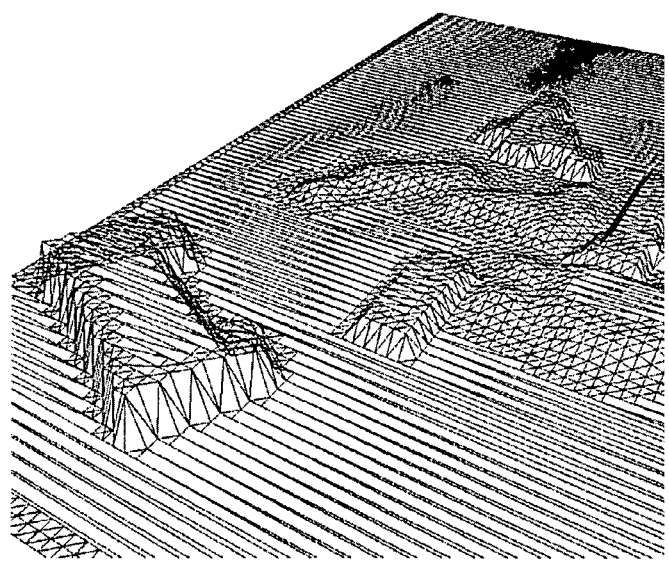
FIG. 9B is a schematic drawing of a three-dimensional model.

Referring to FIG. 9A, upon image integration between a static image and a dynamic video image (e.g., the first image 210 and the second image 230 or the fourth image 270) or between two dynamic video images (e.g., the second image 230 and the fourth image 270), noticeable seams 241 and 242 are formed at a border of the overlapped portion of the images. Hence, it is desirable to use an image fusion technique to make the seams less conspicuous. In this embodiment, the objective is achieved by "interpolation". Taking the image fusion of a static image and a dynamic video image (step 420) for example, the images are first scanned in their entirety to obtain the RGB values (image chromaticity) of each image point, and the obtained values are stored. Then, vertical distances from each image point to the borders of the static image and dynamic image are calculated, wherein the shortest vertical distance of each image point is defined as a, and b is a criterion for determining whether or not to execute fusion. In a case where a<b, fusion is performed on the pixel in question by interpolating the RGB values of the static, large-coverage image and of the surveillance camera video image at a ratio determined by a/b. Thus, depending on the distance a, a transition zone is defined between the static image and the dynamic video image. The governing mathematical equation in this approach is as follows:

"RGB of integrated image=a/b×RGB of static image+ (1−a/b)×RGB of dynamic video image".

Borders of the overlapped portion between dynamic video images are fused in the same way (step 420) to eliminate discontinuous image chromaticity on two sides of the seams and thereby obtain a smoothly integrated image.

After the border processing steps, the integrated image is transferred to a pre-constructed three-dimensional model to endow the integrated image with a sense of space (step 422). This step involves transferring the integrated image which has undergone image fusion to the pre-constructed three-dimensional model, as shown in FIG. 9B, thereby transforming the integrated image from a two-dimensional image to a three-dimensional image. Hence, a person in charge of monitoring is allowed to view the target from different observation angles to obtain the best viewing effect, as well as moving freely within the image and performing rotation and zoom in/zoom out functions on the image. Finally, after the foregoing image processing step is completed, the resultant three-dimensional image is displayed at a step 424.

Figure 10:
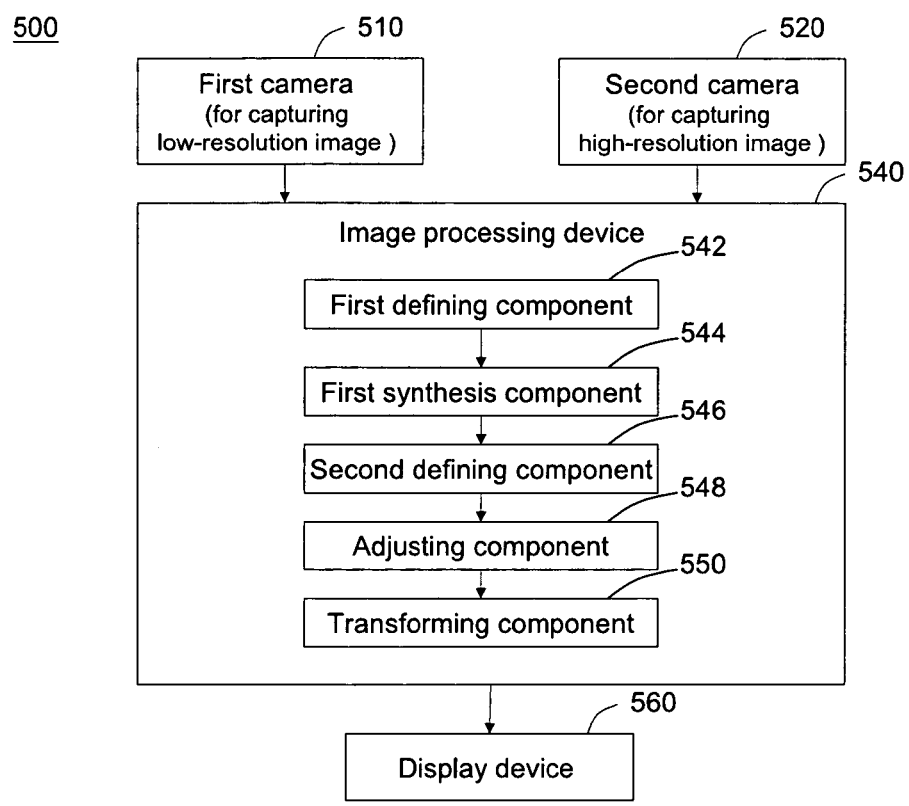
FIG. 10 is a block diagram of an integrated image surveillance system according to a further embodiment of the present invention.

Referring to FIG. 10, an integrated image surveillance system 500 according to another embodiment of the present invention essentially includes: a first camera 510 for capturing a low-resolution first image of an area; a second camera 520 for capturing a high-resolution second image of the area, wherein the second image and the first image have a first overlap region, and the two images are both two-dimensional images; an image processing device 540; and a display device 560. The image processing device 540 includes: a first defining component 542 which is configured to define first set of feature points in the first image and second set of feature points in the second image, wherein the first set of feature points and the second set of feature points have a first registration relation, and the first registration relation defines a first registration function for the first image and the second image; and a first synthesis component 544 which is configured to integrate the first image and the second image according to the first registration function so as to form a third image, wherein, upon overlapping of the two images, data of the second image are shown in the third image, and at least one seam is formed at a border of the overlap region of the two images, with discontinuous image chromaticity on two sides of the seam. In order to overcome the problem of discontinuous image chromaticity, the image processing device 540 further includes a second defining component 546 which is configured to subsequently define the first image into first set of image points each having a first image chromaticity, the second image into second set of image points each having a second image chromaticity, and the third image into third set of image points each having a third image chromaticity. Next, an adjusting component 548 which is configured to extract an appropriate range around the seam as a stitching area, and mixes the first image chromaticities of the first set of image points in the stitching area and the second image chromaticities of the second set of image points in the stitching area at an appropriate ratio to produce corrected third image chromaticities for the third set of image points in the stitching area. Afterward, in order to provide the integrated third image with a sense of space, a transforming component 550 is provided to transform the third image from a two-dimensional image to a three-dimensional image. Finally, the display device 560 displays the third image.

Figure 11:
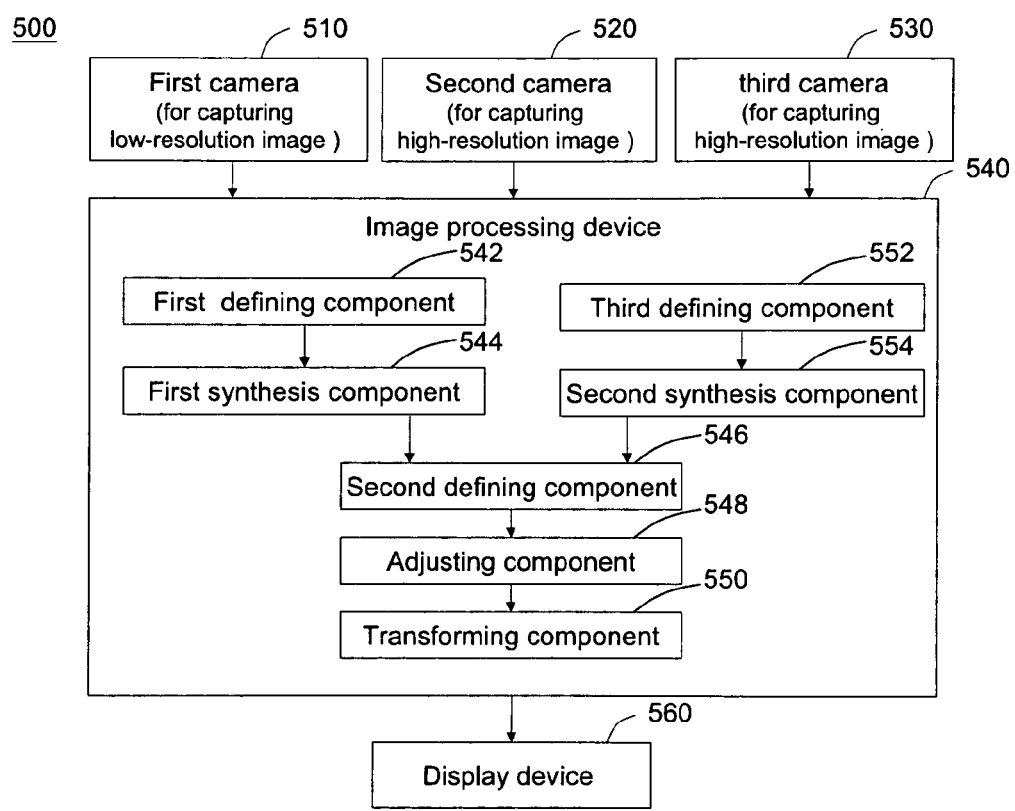
FIG. 11 is a block diagram of an integrated image surveillance system according to another embodiment of the present invention.

Referring to FIG. 11 for still another embodiment of the present invention as a continuation, and having the components, of the previous embodiment, the integrated image surveillance system 500 further includes a third camera 530 for capturing a high-resolution fourth image, wherein the fourth image and the second image have a second overlap region, and the second overlap region and the first overlap region have a third overlap region. In addition, the image processing device further includes a third defining component 552 which is configured to define fourth set of feature points in a portion of the fourth image that is in the third overlap region, and third set of feature points in a portion of the second image that is in the third overlap region, wherein the fourth set of feature points and the third set of feature points have a second registration relation, and the second registration relation further defines a second registration function for the fourth image and the second image; and a second synthesis component 554 which is configured to integrate the second image and the fourth image according to the second registration function so as to form a fifth image, wherein, upon overlapping of the fourth image and the second image, the data of the second image or data of the fourth image are shown in the fifth image. Finally, the fifth image is displayed by the display device 560. Chromatic difference between the second image and the fourth image can also be adjusted by the second defining component 546 and the adjusting component 548 to provide the fifth image with better visual effect.

Figure 12:
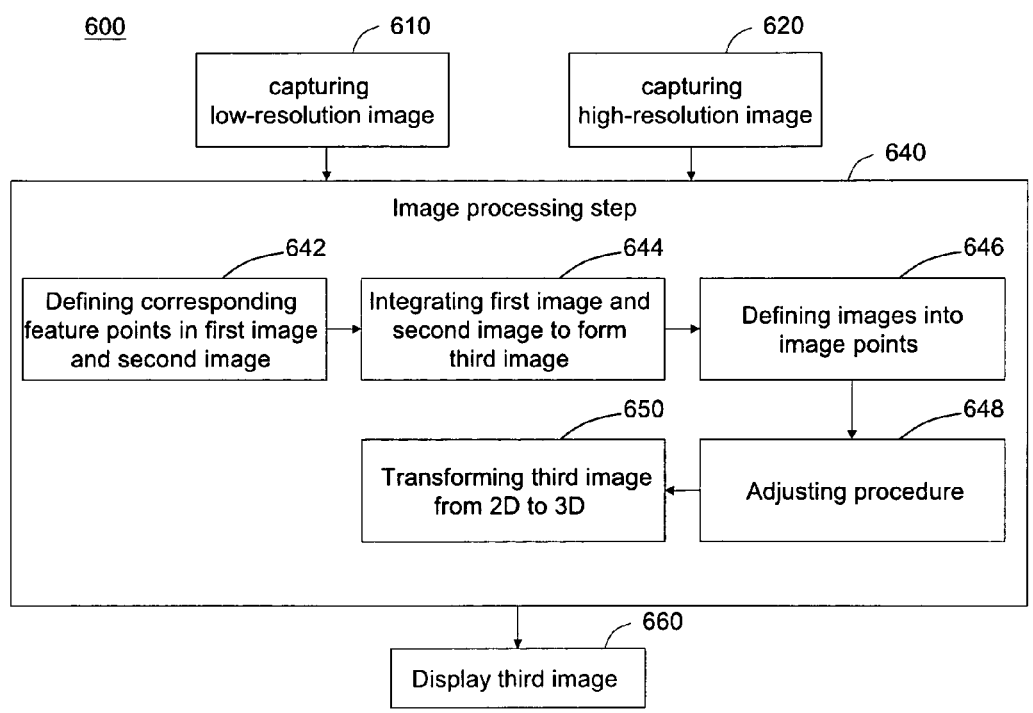
FIG. 12 is a flowchart of an image synthesis method for use in a surveillance system according to yet another embodiment of the present invention.

Referring to FIG. 12, an image synthesis method 600 for use in a surveillance system according to yet another embodiment of the present invention essentially includes: a step 610 of capturing a low-resolution first image of an area; a step 620 of capturing a high-resolution second image of the area, wherein the second image and the first image have a first overlap region, and the two images are both two-dimensional images; providing an image processing step 640; and a step 660 of displaying a third image. The image processing step 640 further includes: a step 642 of defining first set of feature points in the first image and second set of feature points in the second image, wherein the first set of feature points and the second set of feature points have a first registration relation, and the first registration relation defines a first registration function for the first image and the second image; and a step 644 of integrating the second image and the first image into the third image according to the first registration function, wherein for the overlap region, data of the second image are shown in the third image. Since at least one seam is formed at a border of the overlap region of the first image and the second image, with image chromaticity on two sides of the seam being discontinuous, the image processing step 640 further includes: a step 646, the first image, the second image, and the third image are defined respectively into first set of image points each having a first image chromaticity, second set of image points each having a second image chromaticity, and third set of image points each having a third image chromaticity, and an adjusting procedure 648. In the step 648, an appropriate range around the seam is extracted as a stitching area. Subsequently, the first image chromaticities of the first set of image points in the stitching area and the second image chromaticities of the second set of image points in the stitching area are mixed at an appropriate ratio to produce corrected third image chromaticities for the third set of image points in the stitching area. The third image is further transformed, at a step 650, from a two-dimensional image to a three-dimensional image, and finally the third image is displayed at a step 660.

Figure 13:
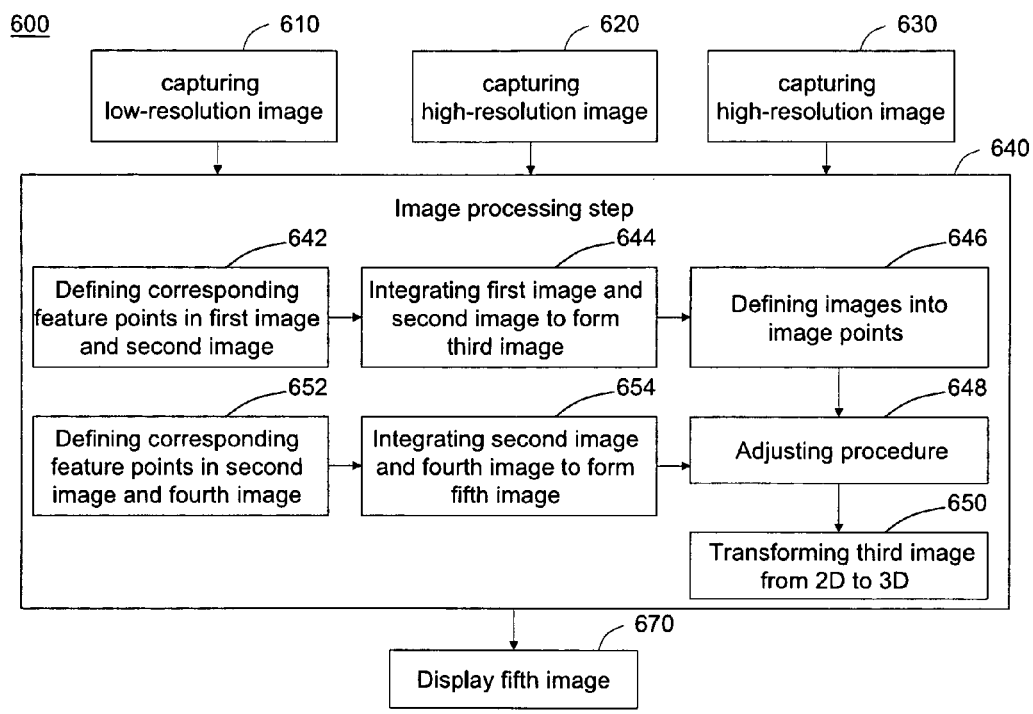
FIG. 13 is a flowchart of an image synthesis method for use in a surveillance system according to still another embodiment of the present invention.

Referring to FIG. 13 for a further embodiment of the present invention as a continuation, and having the steps, of the previous embodiment, the image synthesis method 600 further includes a step 630 of capturing a high-resolution fourth image of the area, wherein the fourth image and the second image have a second overlap region, and the second overlap region and the first overlap region have a third overlap region. In addition, the image processing step 640 further includes: a step 652 of defining fourth set of feature points in a portion of the fourth image that is in the third overlap region, and third set of feature points in a portion of the second image that is in the third overlap region, wherein the fourth set of feature points and the third set of feature points have a second registration relation, and the second registration relation further defines a second registration function for the fourth image and the second image; and a step 654 of integrating the second image and the fourth image according to the second registration function so as to form a fifth image, wherein, upon overlapping of the fourth image and the second image, the data of the second image or data of the fourth image are shown in the fifth image. Finally, the fifth image is displayed at a step 670. Chromatic difference between the second image and the fourth image can also be adjusted in the steps 646 and 648 to provide the fifth image with better visual effect.

The present invention has been demonstrated above with its embodiments and the corresponding drawings. However, it should be understood by one skilled in the art that the embodiments are provided for illustrative purposes only but not intended to limit the scope of the present invention. In other words, changes or modifications which are made to the disclosed elements and do not depart from the concept of the present invention should fall within the scope of the present invention, which is defined only by the appended claims.

The invention claimed is:

1. An integrated image surveillance system, comprising:
a first camera for capturing a first image of an area from a first viewpoint, wherein the first image is a static, large-coverage image of the area;
a second camera for capturing a second image of the area from a second viewpoint displaced from the first viewpoint, wherein the second image is a dynamic, small-coverage image of the area, and the second image and the first image have a first overlap region;
an image processing device, comprising:
 a first defining component, configured to define a first set of feature points in the first image and a second set of feature points in the second image, wherein the first set of feature points and the second set of feature points have a first registration relation, and the first registration relation further defines a first registration function for the first image and the second image;
 a first synthesis component, configured to integrate the first image and the second image according to the first registration function to form a third image, wherein, upon overlapping of the first image and the second image, data of the second image are shown in the third image; and
 a second defining component, configured to define the first image into first set of image points each having a first image chromaticity, the second image into second set of image points each having a second image chromaticity, and the third image into third set of image points each having a third image chromaticity;
 an adjusting component, configured to adjust discontinuous image chromaticity in the third image on two sides of a seam between the first image and the second image;
 a transforming component, configured to transform the third image synthesized from the first image and the second image from a two-dimensional image to a three-dimensional image for better spatial perception; and a display device for displaying the third image.

2. The integrated image surveillance system of claim 1, wherein the adjusting component extracts an appropriate range around the seam as a stitching area, the stitching area being at least part of the first overlap region of the first set of image points and the second set of image points; and mixes the first image chromaticities of the first set of image points with the second image chromaticities of the second set of image points at an appropriate ratio to produce corrected third image chromaticities for the third set of image points in the stitching area.

3. The integrated image surveillance system of claim 1, further comprising a third camera for capturing a fourth image of the area, the fourth image being a dynamic, small-coverage image of the area, wherein the fourth image and the second image have a second overlap region, and the second overlap region and the first overlap region have a third overlap region.

4. The integrated image surveillance system of claim 3, wherein the image processing device further comprises a third defining component, configured to define fourth set of feature points in a portion of the fourth image that is in the third overlap region, and third set of feature points in a portion of the second image that is in the third overlap region, in which the fourth set of feature points and the third set of feature points have a second registration relation, and the second registration relation further defines a second registration function for the fourth image and the second image.

5. The integrated image surveillance system of claim 4, wherein the image processing device further comprises a second synthesis component, configured to integrate the second image and the fourth image according to the second registration function so as to form a fifth image.

6. The integrated image surveillance system of claim 5, wherein, upon overlapping of the fourth image and the second image, the data of the second image or the data of the fourth image are shown in the fifth image; and the display device displays the fifth image.

7. An image synthesis method for use in a surveillance system, comprising steps of:
capturing a first image of an area by a first camera at a first viewpoint, wherein the first image is a static, large-coverage image of the area;
capturing a second image of the area by a second camera at a second viewpoint displaced from the first viewpoint, wherein the second image is a dynamic, small-coverage image of the area, and the second image and the first image have a first overlap region;
providing an image processing step comprising:
defining a first set of feature points in the first image and a second set of feature points in the second image, wherein the first set of feature points of the first image and the second set of feature points in the second image have a first registration relation, and the first registration relation further defines a first registration function for the first image and the second image;
integrating the first image and the second image according to the first registration function to form a third image, wherein, upon overlapping of the first image and the second image, data of the second image are shown in the third image; and
defining the first image into first set of image points each having a first image chromaticity, the second image into second set of image points each having a second image chromaticity, and the third image into third set of image points each having a third image chromaticity;
providing an adjusting procedure for adjusting discontinuous image chromaticity on two sides of a seam between the first image and the second image;
transforming the third image synthesized from the first image and the second image from a two-dimensional image to a three-dimensional image for better spatial perception; and
displaying the third image.

8. The image synthesis method of claim 7, wherein the adjusting procedure comprises extracting an appropriate range around the seam as a stitching area, the stitching area being at least part of the first overlap region of the first set of image points and the second set of image points; and mixing the first image chromaticities of the first set of image points with the second image chromaticities of the second set of image points at an appropriate ratio to produce corrected third image chromaticities for the third set of image points in the stitching area.

9. The image synthesis method of claim 7, further comprising a step of capturing a fourth image of the area by a third camera, the fourth image being a dynamic, small-coverage image of the area, wherein the fourth image and the second image have a second overlap region, and the second overlap region and the first overlap region have a third overlap region.

10. The image synthesis method of claim 9, wherein the image processing step further comprises defining fourth set of feature points in a portion of the fourth image that is in the third overlap region, and third set of feature points in a portion of the second image that is in the third overlap region, in which the fourth set of feature points and the third set of feature points have a second registration relation, and the second registration relation further defines a second registration function for the fourth image and the second image.

11. The image synthesis method of claim 10, wherein the image processing step further comprises integrating the second image and the fourth image according to the second registration function so as to form a fifth image.

12. The image synthesis method of claim 11, wherein, upon overlapping of the fourth image and the second image, the data of the second image or the data of the fourth image are shown in the fifth image; and the fifth image is displayed.

13. An integrated image surveillance system, comprising:
a first camera for capturing a first image of an area from a first viewpoint, wherein the first image is a low-resolution image of the area;
a second camera for capturing a second image of the area from a second viewpoint displaced from the first viewpoint, wherein the second image is a high-resolution image of the area, and the second image and the first image have a first overlap region;
an image processing device, comprising:
a first defining component, configured to define a first set of feature points in the first image and a second set of feature points in the second image, wherein the first set of feature points and the second set of feature points have a first registration relation, and the first registration relation further defines a first registration function for the first image and the second image;
a first synthesis component, configured to integrate the first image and the second image according to the first registration function to form a third image, wherein, upon overlapping of the first image and the second image, data of the second image are shown in the third image; and a second defining component, configured to define the first image into first set of image points each having a first image chromaticity, the second image into second set of image points each having a second image chromaticity, and the third image into third set of image points each having a third image chromaticity;

an adjusting component, configured to adjust discontinuous image chromaticity in the third image on two sides of a seam between the first image and the second image;

a transforming component, configured to transform the third image synthesized from the first image and the second image from a two-dimensional image to a three-dimensional image for better spatial perception; and a display device for displaying the third image.

14. An image synthesis method for use in a surveillance system, comprising steps of:

capturing a first image of an area by a first camera at a first viewpoint, wherein the first image is a low-resolution image of the area;

capturing a second image of the area by a second camera at a second viewpoint displaced from the first viewpoint, wherein the second image is a high-resolution image of the area, and the second image and the first image have a first overlap region;

providing an image processing step comprising:

defining a first set of feature points in the first image and a second set of feature points in the second image, wherein the first set of feature points of the first image and the second set of feature points in the second image have a first registration relation, and the first registration relation further defines a first registration function for the first image and the second image;

integrating the first image and the second image according to the first registration function to form a third image, wherein, upon overlapping of the first image and the second image, data of the second image are shown in the third image; and defining the first image into first set of image points each having a first image chromaticity, the second image into second set of image points each having a second image chromaticity, and the third image into third set of image points each having a third image chromaticity;

providing an adjusting procedure for adjusting discontinuous image chromaticity on two sides of a seam between the first image and the second image;

transforming the third image synthesized from the first image and the second image from a two-dimensional image to a three-dimensional image for better spatial perception; and displaying the third image.

* * * * *